ated Sep. 2, 1980

United States Patent [19]
Kawaida et al.

[11] 4,220,494
[45] Sep. 2, 1980

[54] TIRE BUILDING DRUM

[75] Inventors: Sinji Kawaida, Higashimurayama; Yoshihumi Kitayama, Kodaira, both of Japan

[73] Assignee: Bridgestone Tire Company Limited, Tokyo, Japan

[21] Appl. No.: 952,956

[22] Filed: Oct. 20, 1978

[30] Foreign Application Priority Data

Oct. 28, 1977 [JP] Japan .................... 52-129955

[51] Int. Cl.² .......................................... B29H 17/16
[52] U.S. Cl. .................................... 156/415; 156/420
[58] Field of Search ............... 156/414, 415, 416, 417, 156/418, 419, 420

[56] References Cited

U.S. PATENT DOCUMENTS

| 2,335,169 | 11/1943 | Bostwick | 156/415 |
| 2,353,767 | 7/1944 | Schnedarek | 156/415 |
| 2,413,445 | 12/1946 | Freeman et al. | 156/415 |
| 2,979,110 | 4/1961 | Henley | 156/415 |
| 3,644,162 | 2/1972 | Appleby et al. | 156/420 |
| 3,948,717 | 4/1976 | Suzuki et al. | 156/415 |
| 4,126,507 | 11/1978 | Kim et al. | 156/415 |
| 4,138,307 | 2/1979 | Rost | 156/415 |

Primary Examiner—John E. Kittle
Attorney, Agent, or Firm—Cushman, Darby & Cushman

[57] ABSTRACT

Herein disclosed is a tire building drum which is constructed expansible in diameter and stretchable in width. The tire building drum comprises in combination: a plurality of base segments circumferentially arranged to define as a whole a cylindrical drum body and adapted to be radially expansible; a pair of side flange means disposed oppositely at axially outer positions of the base segments to be movable along the axial direction of the drum body toward and away from the base segments; and a drum width arranging means for adjusting a drum width measured along the axial direction of the drum body between the side flange means: characterized in that each of the side flange means includes a slide base provided axially movably toward and away from each of the base segments and a side flange axially movably toward and away from the slide base; and that the drum width arranging means includes a pair of screw shafts having oppositely threaded portions which are in threaded engagement with the slide base and the side flange, respectively, for connecting the slide base and side flange, a rotary shaft having axially outer end portions axially slidably received in the screw shafts and rotatable in unison with the screw shafts, and a rotary shaft rotating mechanism provided at the central portion of the rotary shaft to transform a radial rotational force into an axial rotational force for transmitting the same to the rotary shaft; whereby the rotary shaft is rotated by the rotary shaft rotating mechanism to cause the side flange to be axially moved toward and away from the slide bases.

5 Claims, 5 Drawing Figures

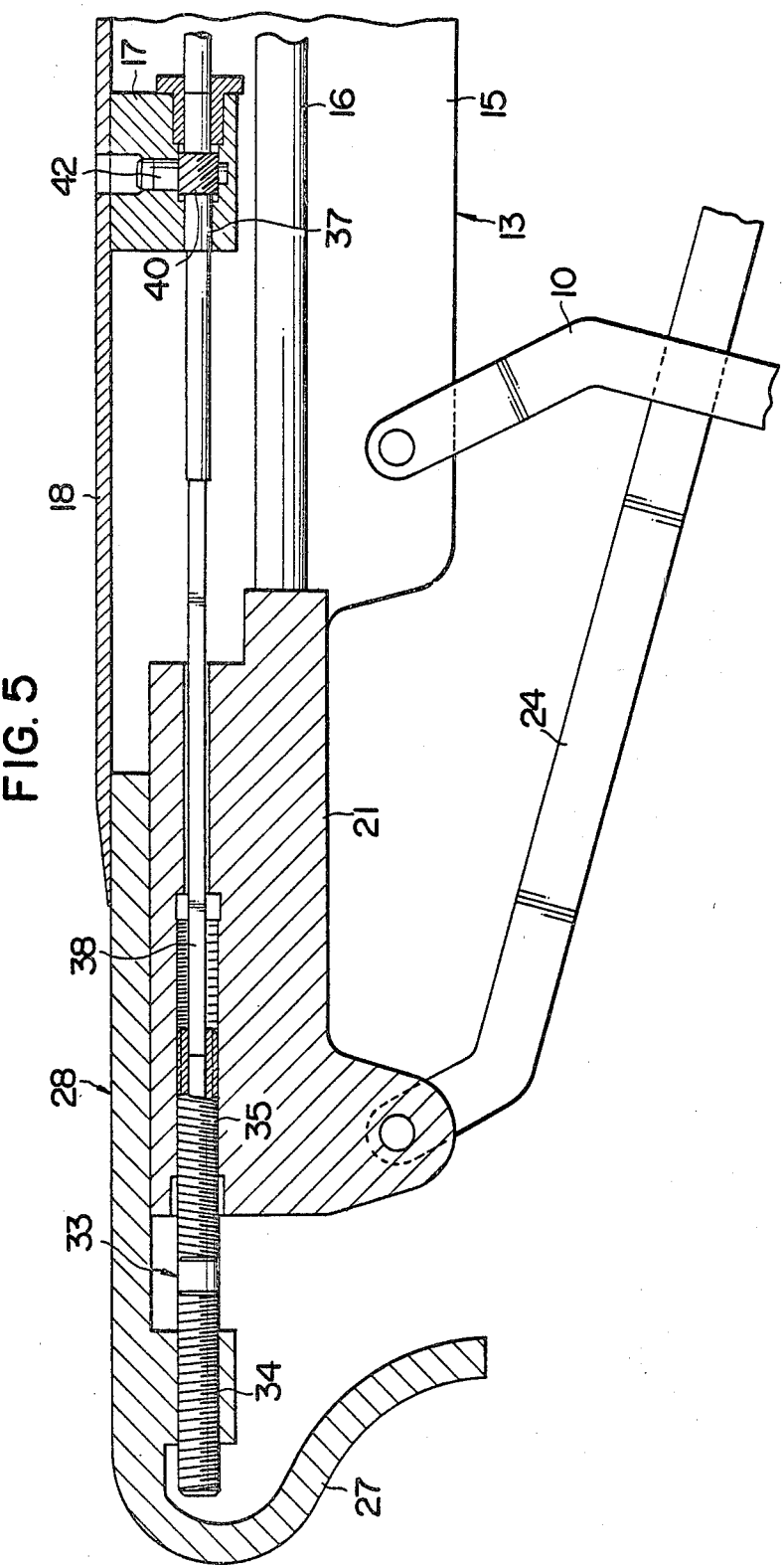

TIRE BUILDING DRUM

FILED OF THE INVENTION

The present invention relates to a tire building drum which is constructed expansible in diameter and stretchable in width, and in more particular to an under-cut type tire building drum which has a mechanical drum width adjusting means for stretching its width in synchronism with its expansion in diameter.

BACKGROUND OF THE INVENTION

There has been proposed an under-cut type tire building drum, stretchable in width in synchronism with its expansion in diameter, wherein a pair of side flanges are attached to both sides of a drum body by means of bolts and nuts. In such a tire building drum, the drum width thereof is required to be adjusted accompanied by the size change of tires to be built on the tire building drum. For the requirement, either of the side flanges or the drum body should be provided with slots to be inserted by the bolts and the side flanges should be moved with respect to the drum body for adjusting the drum width of the tire building drum. Even in the case of the tire building drum which can be adjusted in width, the attachment of the side flanges and the drum body is effected by their frictional contact caused by tightening of the bolts and nuts. The bolts and nuts are often easily loosen to cause the side flanges to freely be moved, thereby deranging the adjusted drum width during consecutive operations of the tire building drum so that the side flanges are brought into contact and collision with each other upon collapsing to damage the tire building drum itself and shorten its span of life. On the other hand, the drum width adjusting operation is manually effected by properly moving the side flanges with respect to the drum body, thereby causing laborious and tedious operations to the operators.

SUMMARY OF THE INVENTION

It is therefore an object of the present invention to provide a tire building drum which is stretchable in width in synchronizm with its expansion in diameter without deranging the adjusted drum width even during consecutively repeated tire building operations.

It is another object of the present invention to provide an under-cut type tire building drum which comprises a drum width adjusting means which makes it possible to easily and reliably carry out the drum width adjustment.

In order to attain the above objects, the tire building drum according to the present invention comprises in combination: a plurality of base segments circumferentially arranged to define as a whole a cylindrical drum body and adapted to be radially expansible; a pair of side flange means disposed oppositely at axially outer positions of the base segments to be movable along the axial direction of the drum body toward and away from the base segments; and a drum width arranging means for adjusting a drum width meansured along the axial direction of the drum body between the side flange means: characterized in that each of the side flange means includes a slide base provided axially movably toward and away from each of the base segments and a side flange axially movably toward and away from the slide base; and that the drum width arranging means includes a pair of screw shafts having oppositely threaded portions which are in threaded engagement with the slide base and the side flange, respectively, for connecting the slide base and side flange, a rotary shaft having axially outer end portions axially slidably received in the screw shafts and rotatable in unison with the screw shafts, and a rotary shaft rotating mechanism provided at the central portion of the rotary shaft to transform a radial rotational force into an axial rotational force for transmitting the same to the rotary shaft; whereby the rotary shaft is rotated by the rotary shaft rotating mechanism to cause the side flanges to be axially moved toward and away from the slide bases.

BRIEF DESCRIPTION OF THE DRAWINGS

The above and other objects, features and advantages of the present invention will become clear from the following particular description of the invention and the appended claims, taken in conjunction with the accompanying drawings which show by way of example a preferred embodiment of the present invention.

In the accompanying drawings:

FIG. 5 is an enlarged cross-sectional view showing the expanded and stretched states of the tire building drum after it is adjusted in width.

Figure 1:
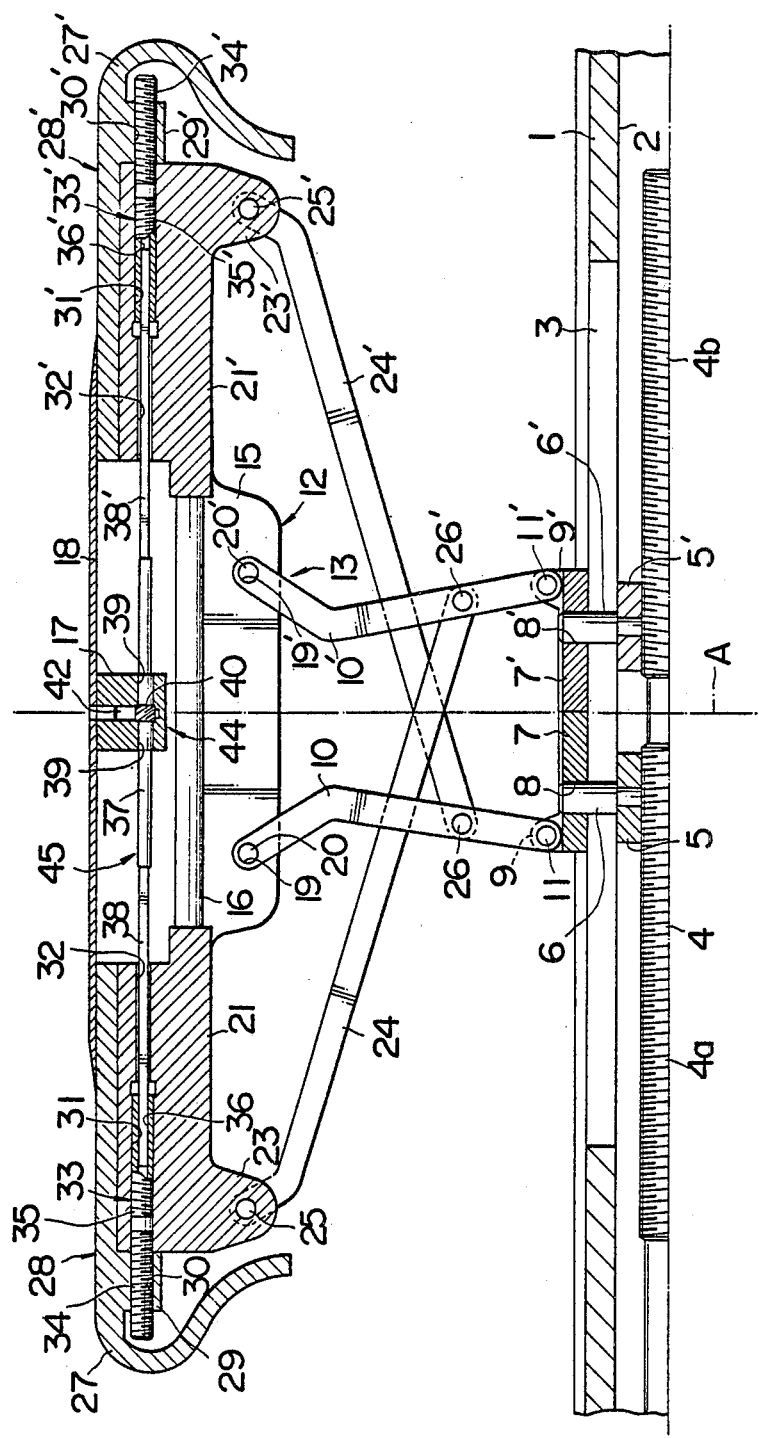
FIG. 1 is a cross-sectional view cross-sectioned axially of a tire building drum according to the present invention and showing radially expanded and axially stretched states before the tire building drum is adjusted in width.
Figure 2:
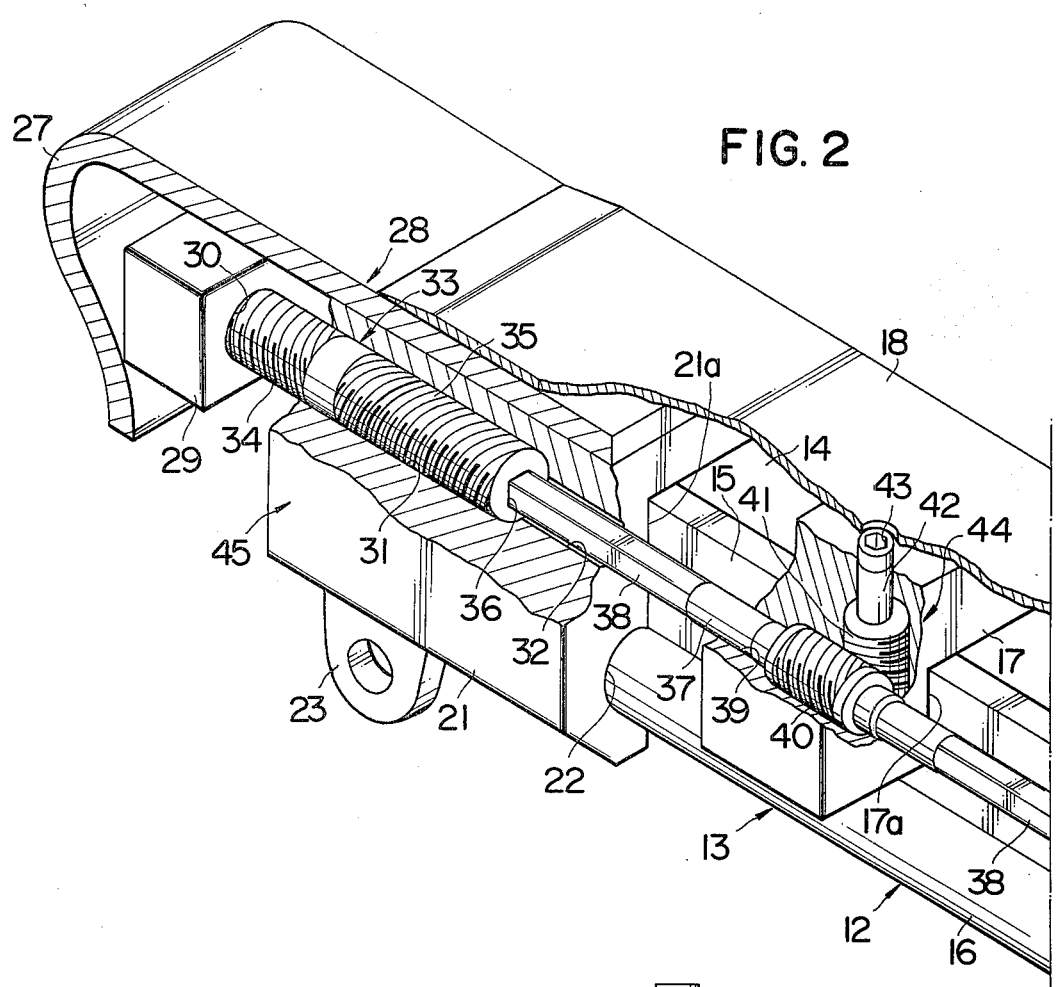
FIG. 2 is a perspective view showing a drum body, a pair of side flange means, a rotary shaft rotating mechanism and a drum width arranging means constituting the tire building drum under the states similar to FIG. 1.

Referring now to the drawings and in particular to FIGS. 1 and 2, the reference numeral 1 indicates a drive shaft which is rotatably supported by a frame not shown in a cantilever fashion and is drivingly rotated by a suitable driving mechanism also not shown. The drive shaft 1 has therein a through bore 2 extending axially and a plurality of slits 3 equi-angularly disposed and extending axially, each of the slits 3 having a radially outer end opened at the outer peripheral surface of the drive shaft 1 and a radially inner end opened at the inner peripheral surface of the through bore 2. Within the through bore 2 of the drive shaft 1 is rotatably inserted a threaded shaft 4 which is adapted to have axial portions 4a and 4b oppositely threaded from its axially central portion toward its axially outer ends and is drivingly rotated by a suitable driving mechanism not shown. A pair of slide nuts 5 and 5' are in threaded engagement with the axial portions 4a and 4b, respectively, of the threaded shaft 4 to have outer peripheral surfaces in sliding contact with the inner peripheral surface of the through bore 2. The slide nuts 5 and 5' are disposed equi-distantly from a mid-circumferential plane A of a tire building drum according to the present invention. As a result, rotation of the threaded shaft 4 by means of the driving mechanism causes the slide nuts 5 and 5' to be moved toward and away from each other in the through bore 2 along the axial direction of the threaded shaft 4. On the slide nut 5 are equi-angularly spaced and securely mounted a plurality of radially extending pins 6 each of which is inserted into and in sliding contact with each of the slits 3. In a similar manner, a plurality of radially extending pins 6' are equiangularly spaced and securely mounted on the slide nut 5' with each of the pins 6 being inserted into and in sliding contact with each of the slits 3. A plurality of arcuate sliders 7 are axially slidably mounted on the outer periphery of the drive shaft 1, and each of the arcuate sliders 7 has a radial bore 8 to be securely inserted by the radially outer end portion of each of the pins 6. Also, a plurality of arcuate sliders 7' are axially slidably mounted on the outer periphery of the drive shaft 1, and each of the arcuate sliders 7' has a radial bore 8' to be sucurely inserted by the radially outer end portion of each of the pins 6'. The arcuate sliders 7 and 7' are axially movable toward and away from each other to be equally spaced from the mid-sircumferential plane A of the tire building drum by means of the threaded shaft 4 through the slide nuts 5, 5' and the pins 6, 6'. On the peripheral surface of each of the sliders 7 is integrally formed a bracket 9 to which a link 10 is pivotally connected at its radially inner end through a pivotal pin 11. Also, a bracket 9' is integrally formed on the peripheral surface of each of the sliders 7', and another link 10' is pivotally connected at its radially inner end to the bracket 9' through a pivotal pin 11'. A plurality of arcuate base segments generally indicated at 12 are arranged in radially spaced relation with the drive shaft 1 to collectively define a cylindrical drum body 13. Each of the base segments 12 comprises a guide member 15 having a groove 14 to extend in parallel relation with the drive shaft 1. On the both side faces of the guide member 15 are integrally formed a pair of semi-spherically cross-sectioned guide rods 16 which extend in parallel relation with the drive shaft 1. An attachment block 17 is securely mounted on the central portion of the guide member 15 to have an axially extending groove 17a in engagement with the guide member 15 and a radially outer surface to which is attached an arcuate cover plate 18. At radially inner portions of the guide member 15 equally spaced from the mid-circumferential plane A of the tire building drum are formed a pair of bores 19 and 19' respectively receiving pivotal pins 20 and 20' to which the radially outer ends of the links 10 and 10' are respectively pivotally connected, with the result that when the sliders 7 and 7' are moved toward each other, the guide member 15, the attachment block 17 and the cover plate 18 constituting as a whole the base segment 12 are radially outwardly moved away from the drive shaft 1 and that when the sliders 7 and 7' are moved away from each other, the base segment 12 is radially inwardly moved toward the drive shaft 1, thereby causing the drum body 13 to be radially collapsible and expansible. A pair of slide bases 21 and 21' are slidably mounted on the both end portions of the guide member 15 to have respective axially extending grooves 21a and 21a', the latter of which is not shown but formed in the slide base 21' in a similar fashion to the groove 21a, in sliding engagement with the guide member 15. A pair of semi-spherically cross-sectioned guide grooves 22 are formed on the opposite faces of each of the axially extending grooves 21a and 21b to extend in the axial direction of the drum body 13 in sliding engagement with the guide rods 16 so that the slide bases 21 and 21' can be axially moved on the guide member 15 in equally spaced relation from the mid-circumferential plane A of the tire building drum while guided by the guide rods 16. On the radially inner end portions of the slide bases 21 and 21' are respectively formed brackets 23 and 23' which project radially inwardly. A link 24 is pivotally connected at one end to the bracket 23 through a pivotal pin 25 and at the other end to the longitudinally intermediate portion of the link 10' through a pivotal pin 26'. Another link 24' is also pivotally connected at one end to the bracket 23' through a pivotal pin 25' and at the other end to the longitudinally intermediate portion of the link 10 through a pivotal pin 26. The slide bases 21 and 21' are therefore moved away from each other in synchronism with the expansion of the drum body 13 when the sliders 7 and 7' are moved toward each other, while being moved toward each other in synchronism with the collapse of the drum body 13 when the sliders 7 and 7' are moved away from each other. A side flange 27 is slidably supported on the slide base 21 in such a way that the side flange 27 is movable with respect to the slide base 21 between the slide base 21 and the cover plate 18. Similarly, another side flange 27' is slidably supported on the slide base 21 in such a way that the side flange 27' is movable with respect to the slide base 21' between the slide base 21' and the cover plate 18. The foregoing slide base 21 and the side flange 27 constitute as a whole a side flange means 28 which is moved in the axial direction of the drum body 13 toward and away from another side flange means 28' constituted by the previously mentioned slide base 21' and the side flange 27'.

Figure 3:
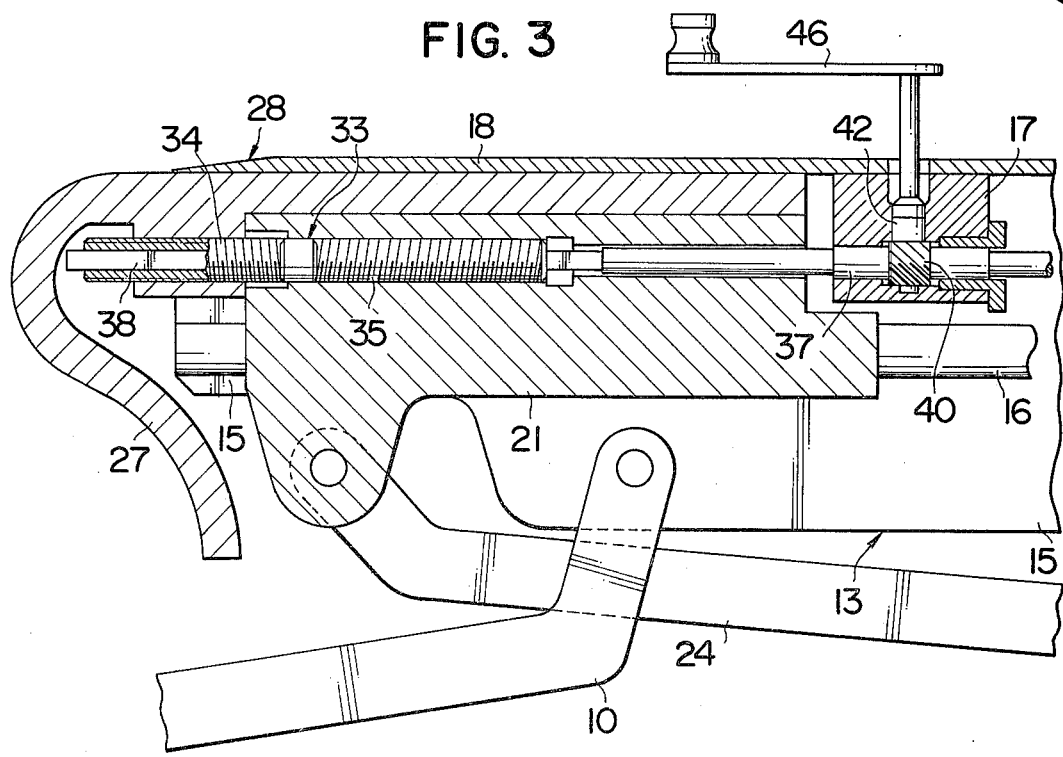
FIG. 3 is an enlarged cross-sectional view partially showing collapsed and reduced width states of the tire building drum before it is adjusted in width.

On the inner faces of the side flanges 27 and 27' are respectively formed radially inwardly projecting protrusions 29 and 29' which respectively have threaded bores 30 and 30' extending in the axial direction of the drum body 13. On the other hand, threaded bores 31 and 31' are formed in the side bases 21 and 21' respectively in axial alignment with the threaded bores 30 and 30' to have opposite threads to the threaded bores 30 and 30'. Axial bores 32 and 32' are formed in the slide bases 21 and 21' repectively to have one ends connected to the threaded bores 31, 31' and the ohter ends opened at the opposing faces of the slide bases 21 and 21'. A screw shafts 33 has at one end portion a threaded portion 34 in threaded engagement with a threaded bore 30 and at the other end portion a threaded portion 35 oppositely threaded to the threaded portion 34 and in engagement with the threaded bore 31 so as to connect the slide base 21 with the flange 27. Also, another screw shaft 33' has at one end portion a threaded portion 34' in threaded engagement with a threaded bore 30' and at the other end portion a threaded portion 35' oppositely threaded to the threaded portion 34' and in engagement with the threaded bore 31' so as to connect the slide base 21' with the side flange 27'. In the screw shafts 33 and 33' are respectively formed square cross-sectioned bores 36 and 36' which extend along its axial direction and respectively receive square cross-sectioned portions 38 and 38' formed at both end portions of a rotary shaft 37 so that the threaded shafts 33 and 33' are movable relatively with respect to the rotary shaft 37 in the axial direction of the drum body 13 and rotated together with the rotary shaft 37. As a result, the side flanges 27 and 27' are respectively moved toward and away from the slide bases 21 and 21' when the rotary shaft 37 is rotated to cause the threaded shafts 33 and 33' to be rotated. The rotary shaft 37 has a longitudinally intermediate portion circular in cross-section to be rotatably inserted throughout a bore 39 which is formed in the attachment block 17. On the longitudinally intermediate portion of the rotary shaft 37 is securely mounted a herical gear 40 which is in meshing engagement with a herical gear 41 having a rotational axis perpendicular to the rotational axis of the rotary shaft 37. A shaft 42 is rotatably received in the attachment block 17 and securely connected with the herical gear 41 in coaxial relation therewith. In the radially outer portion of the shaft 42 is formed a hexagonal cross-sectioned hole 43 which is to be brought into engagement with a crank shaft 46 as shown in FIG. 3. The shaft 42 is required to extend within the radially outer surface of the cover plate 18. The above-mentioned herical gears 40, 41 and the shaft 42 constitute as a whole a rotary shaft rotating mechanism 44 which transform a radial rotational force into an axial rotational force for rotating the rotary shaft 37. The foregoing threaded shafts 33 and 33', the rotary shaft 37 and the rotary shaft rotating mechanism 44 constitute as a whole a drum width arranging means 45.

The operation of the tire building drum thus constructed in accordance with the present invention will now be described hereinafter.

When the drum body 13 of the tire building drum according to the present invention is under the state of being expanded, the slide nuts 5 and 5' are moved to assume respective nearest positions so that the sliders 7 and 7' assume respective nearest positions through the pivotal pins 6 and 6' and the links 10, 10', 24 and 24' assume their positions as shown in FIG. 1. The drum body 13 is therefore moved remotest from the drive shaft 1 to assume an expansion state, whereupon the side flange means 28 and 28' are remotest from the base segment 12 to assume a stretched state.

In order to make the tire building drum narrower in width simultaneously with reduction in diameter of the same which is under the expansion and stretched states, the threaded shaft 4 is driven to rotate so that the slide nuts 5 and 5' are moved away from each other along the threaded shaft 4 and the sliders 7 and 7' are also moved away from each other simultaneously with the slide nuts 5 and 5' through the pivotal pins 6 and 6'. The links 10 and 10' are gradually inclined to reduce the drum body 13 in diameter. On the other hand, the side flange means 28 and 28' are radially inwardly moved together with the drum body 13 and concurrently axially moved along the guide rod 16 by the action of the links 24 and 24'. The side flange means 28 and 28' are thus made narrower in width in synchronism with the diameter reduction of the drum body 13. At this time, the threaded shafts 33 and 33' are moved toward each other while connecting the side flanges 27, 27' and the slide bases 21, 21' since the rotary shaft 37 is slidably inserted into the square bores 36 and 36'. The rotation of the threaded shaft 4 is stopped when the threaded shaft 4 is further rotated to move the slide nuts 5 and 5' to their remotest positions. At this time, the links 10, 10', 24 and 24' are most inclined to cause the tire building drum to assume collapsed and shrinked states.

Figure 4:
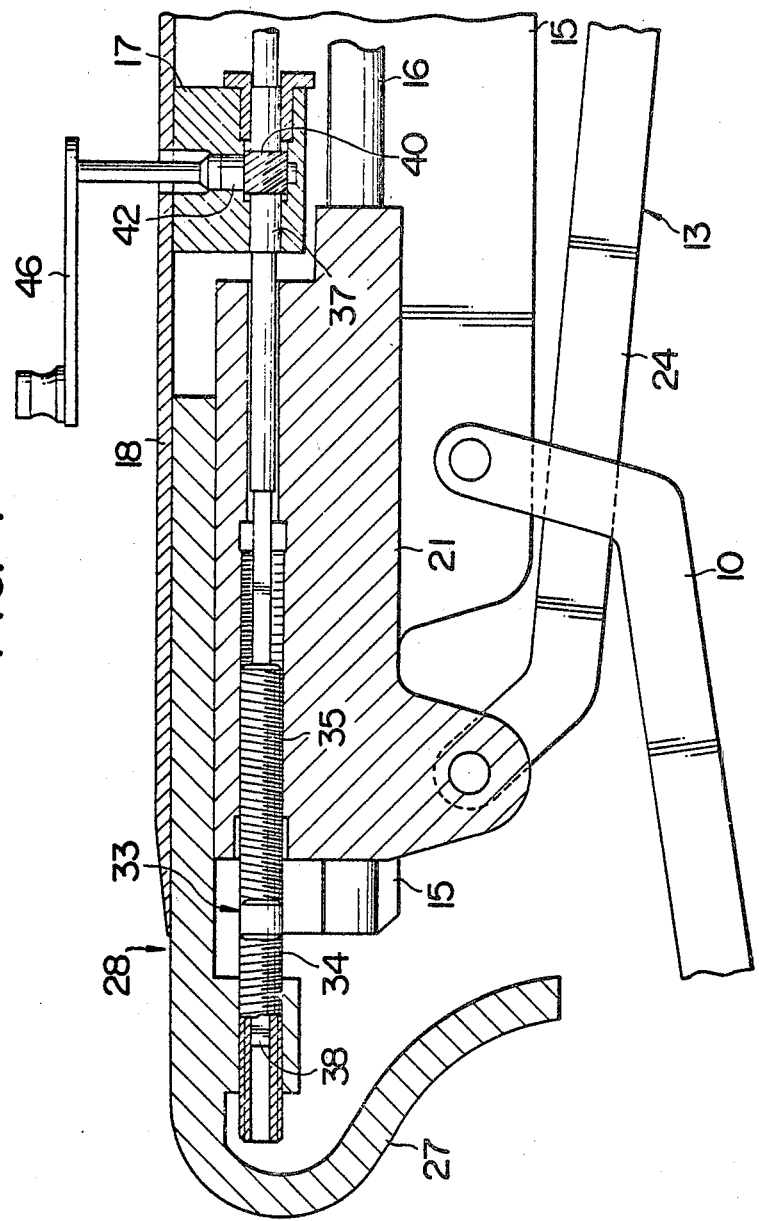
FIG. 4 is an enlarged cross-sectional view partially showing the collapsed and reduced width states of the tire building drum after it is adjusted in width.

In order to adjust the drum width accompanying by the size change of a tire to be shaped, the forward end portion of the crank shaft 46 is firstly inserted into the hexagonal hole 43 of the shaft 42 as shown in FIG. 3. The crank shaft 46 is then rotated to impart rotation to the shaft 42 so that the rotary shaft 37 is rotated together with the threaded shafts 33 and 33' through the herical gears 40 and 41. The side flanges 27 and 27' are moved toward and away from the slide bases 21 and 21' in the axial direction of the drum body 13 since the threaded portions 35 and 35' in threaded engagement with the slide bases 21 and 21', respectively, of the threaded shafts 33 and 33' are oppositely threaded with respect to the threaded portions 34 and 34' in threaded engagement with the side flanges 27 and 27'. The predetermined revolutions of the crank shaft 46 result in projecting and retracting the side flanges 27 and 27' in a predetermined distance to adjust the drum width of the tire building drum as shown in FIG. 4.

In order to expand and stretch the tire building drum after being adjusted in width, the threaded shaft 4 is rotated in the direction opposite to the previously mentioned direction so that the slide nuts 5, 5' and the sliders 7, 7' are moved toward each other. The drum body 13 is thus radially outwardly moved together with the side flange means 28 and 28' which are simultaneously spaced apart from each other in the axial direction of the drum body 13. In this way, the tire building drum is expanded and stretched to assume its expanded and stretched state as shown in FIG. 5.

In place of the square cross-sectioned bores 36 and 36' previously mentioned in the above-embodiment, splined bores or polygonal bores may be formed in the threaded shafts 33 and 33' to be in engagement with splined shafts or polygonal shafts in accordance with the present invention.

While it has been disclosed that the rotary shaft rotating mechanism 44 comprises the herical gears 40, 41 and the shaft 42, the rotary shaft rotating mechanism 44 may comprise a worm gear in place of the herical gear 40, a worm wheel in place of the herical gear 41 and the shaft 42 to rotate the rotary shaft 37 according to the present invention.

What is claimed is:

1. A tire building drum, comprising in combination:
   a plurality of base segments circumferentially arranged to define as a whole a cylindrical drum body and adapted to be radially expansible;
   a pair of side flange means disposed oppositely at axially outer positions of said base segments to be movable along the axial direction of the drum body toward and away from said base segments;
   a synchronized drum width changing means axially moving said side flange means toward and away from each other in synchronism with radial retraction and expansion of said base segments;
   and a drum width arranging means operated independently of said synchronized drum width changing means for adjusting a drum width measured along the axial direction of the drum body between said side flange means:
   characterized in that
   each of said side flange means includes a slide base provided axially movably toward and away from each of said base segments and a side flange axially movably toward and away from said slide base; and that
   said drum width arranging means includes:
   a pair of screw shafts having oppositely threaded portions which are in threaded engagement with said slide base and said side flange, respectively, for connecting said slide base and side flange,
   a rotary shaft having axially outer end portions axially slidably received in said screw shafts and rotatable in unison with said screw shafts, and
   a rotary shaft rotating mechanism provided at the central portion of said rotary shaft to transform a radial rotational force into an axial rotational force for transmitting the same to said rotary shaft, whereby said rotary shaft is rotated by said rotary shaft rotating mechanism to cause said side flange to be axially moved toward and away from said slide bases.

2. A tire building drum as set forth in claim 1, wherein each of said base segments includes a guide member having a groove formed on the radially outer face thereof to axially extend, an attachment block securely mounted on the central portion of said guide member to have an axially extending groove in engagement with said guide member and to rotatably receive said rotary shaft, and a cover plate securely mounted on said attachment block and having both opposite end portions partially covering the radially outer faces of said side flanges to form an arcuate cylindrical surface together with said side flanges.

3. A tire building drum as set forth in claim 1, wherein a radially inwardly projecting protrusion is formed on the inner face of each of said side flanges and has a threaded bore extending in the axial direction of said drum body to be in threaded engagement with one of said oppositely threaded portions of said screw shaft; and a threaded bore is formed in each of said slide base in axial alignment with said threaded bore of said radially inwardly projecting protrusion to be in threaded engagement with the other of said oppositely threaded portions of said screw shaft.

4. A tire building drum as set forth in claim 1, wherein a square cross-sectioned bore is formed in each of said screw shafts to extend along its axial direction and to receive a square cross-sectioned portion formed at each of said opposite end portions of said rotary shaft.

5. A tire building drum as set forth in claim 2, wherein said rotary shaft rotating mechanism includes a first herical gear securely mounted on the longitudinally intermediate portion of said rotary shaft, a second herical gear having a rotational axis perpendicular to the rotational axis of said rotary shaft and in meshing engagement with said first herical gear, and a shaft rotatably received in said attachement block and securely connected with said herical gear in coaxial relation therewith, said shaft having an axially outer end portion formed with a hexagonal cross-sectioned hole and extending within the radially outer surface of said cover plate.

* * * * *